United States Patent [19]
Rod

[11] Patent Number: 5,867,210
[45] Date of Patent: Feb. 2, 1999

[54] STEREOSCOPIC ON-SCREEN SURGICAL MICROSCOPE SYSTEMS

[76] Inventor: Samuel R. Rod, 11316 Bright Pond La., Reston, Va. 22094

[21] Appl. No.: 598,902

[22] Filed: Feb. 9, 1996

[51] Int. Cl.$^6$ ..................................................... H04N 13/04
[52] U.S. Cl. ............................................... 348/51; 348/79
[58] Field of Search .................................. 348/42, 45, 46, 348/47, 49, 51, 53, 54, 55, 56, 57, 65, 66, 73, 77, 79, 80, 61

[56] References Cited

U.S. PATENT DOCUMENTS

| | | |
|---|---|---|
| 4,967,268 | 10/1990 | Lipton et al. . |
| 4,987,488 | 1/1991 | Berci ......................................... 348/79 |
| 5,193,000 | 3/1993 | Lipton et al. . |
| 5,545,120 | 8/1996 | Chen et al. ................................ 348/61 |
| 5,652,676 | 7/1997 | Grinblat .................................. 359/363 |

OTHER PUBLICATIONS

H. Kobayashi, et al., *Three Dimensional videomonitor in microsurgery*, Neuroschicurgis 36, pp. 129–130.

J. Reiner, *Possible Methods of Reproducing Stereoscopic Images on Monitors in Combination with the Operating Microscope*, Klin. Mbl. Augenheilk. 196 (1990), pp. 51–53.

Hiroshi Okudera, et al., *Introduction of high definition television system to neurosurgical documentation*, Neurological Research, 1992, vol. 14, Dec. pp. 386–388.

Hiroshi Okudera, et al., *Three–dimensional Hi–Vision System for Microneurosurgical Documentation Based on Wide–vision Telepresence System Using One Camera and One Monitor*, Med. Chir (Tokyo) 33, (1993) pp. 719–721.

H.F. Reinhardt, et al., *Stereo–Microvision Development of an Opto–Electronic Operating Microscope*, Bildgebung 1993, pp. 105–109.

Crystal Eyes *Video System User's Manual*, Crystal Eyes Stereographics, pp. 56–61.

Gene E. Schlueter, et al., *The stereomicroscope Instrumentation And Techniques*, Reprinted from American Laboratory, Apr. 1976.

Ralph JPM Franken, MD., *Three–Dimensional Applications In Surgery Past–Present–Future*, First VR in Med and Developers' Expo, Jun. 1–4, 1995.

*European Surgical Research Clinical and Experimental Surgery*, 30th Congress of the European Society for Surgical Research, May 10–13, 1995, The Netherlands.

Kenichiro Sugita, et al., *Stereoscopic television system for use with the operating microscope*, J. Neurosug 62, 1983, pp. 610–611.

Samuel E. Rod, *Combined Stereoscopic Telepresence and Virtual Reality in Surgical Training*, presented at the Virtual Reality in Medicine and Developers' Expo, Jun. 1–4, 1995, Cambridge, Massachusetts, Bristlecone Corp., Jun. 1995, pp. 1–7.

Berisch Strauch, et al., *Three–Dimensional Imaging In Microvascular Surgery*, The Journal of Medicine and Virtual Reality, pp. 34–35.

*Microsurgery Without A Microscope: Development Of A Three–Dimensional On–Screen Microsurgery System (TOMS)*, The Journal Of Medicine And Virtual Reality, vol. 1, No. 1, Spring 1995, pp. 2, 26–32.

*Primary Examiner*—Bryan Tung
*Attorney, Agent, or Firm*—Burns, Doane, Swecker & Mathis LLP

[57] ABSTRACT

Stereoscopic on-screen surgical microscope systems are disclosed. One or more stereoscopic displays are provided which are corrected to the viewpoint of the participant or observer. A switching system which may be connected to the deflection yokes of a video monitor and a stereoscopic encoder, is employed to selectively provide up-down reversal, right-left reversal, and reversal of the images viewed by each eye. A stereoscopic video camera pod is employed to retrofit a surgical microscope to provide a field of view and magnification comparable to that obtained at the microscope eyepieces.

15 Claims, 7 Drawing Sheets

FIG. 3a
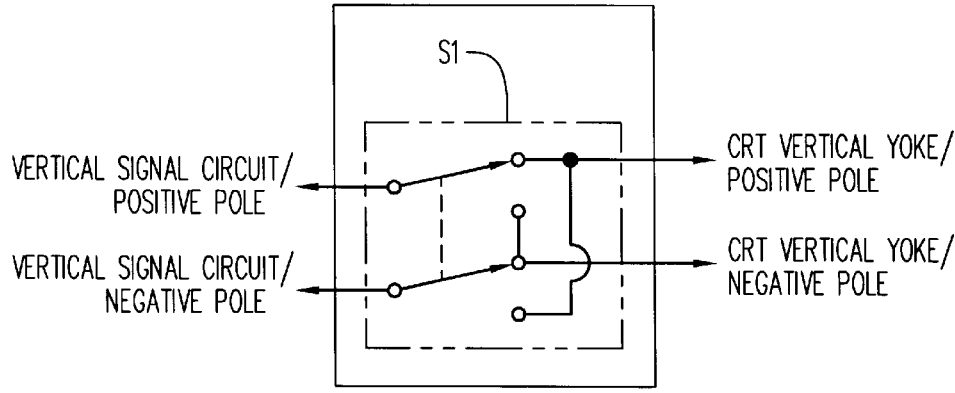
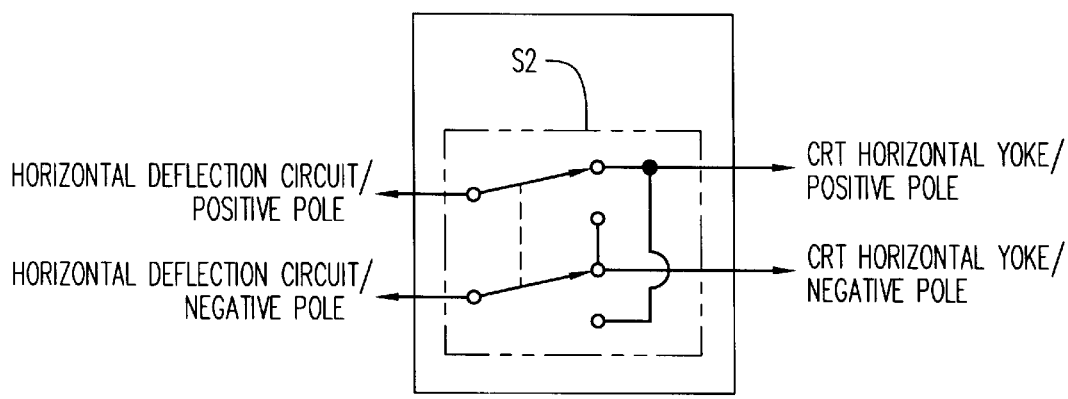
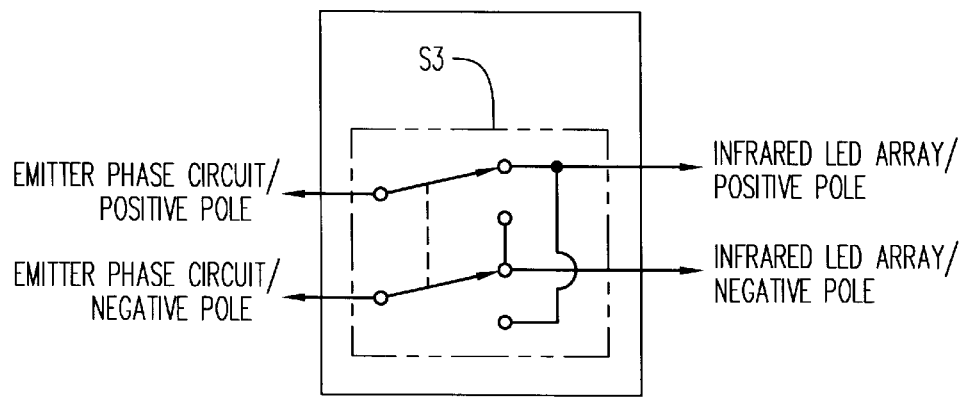

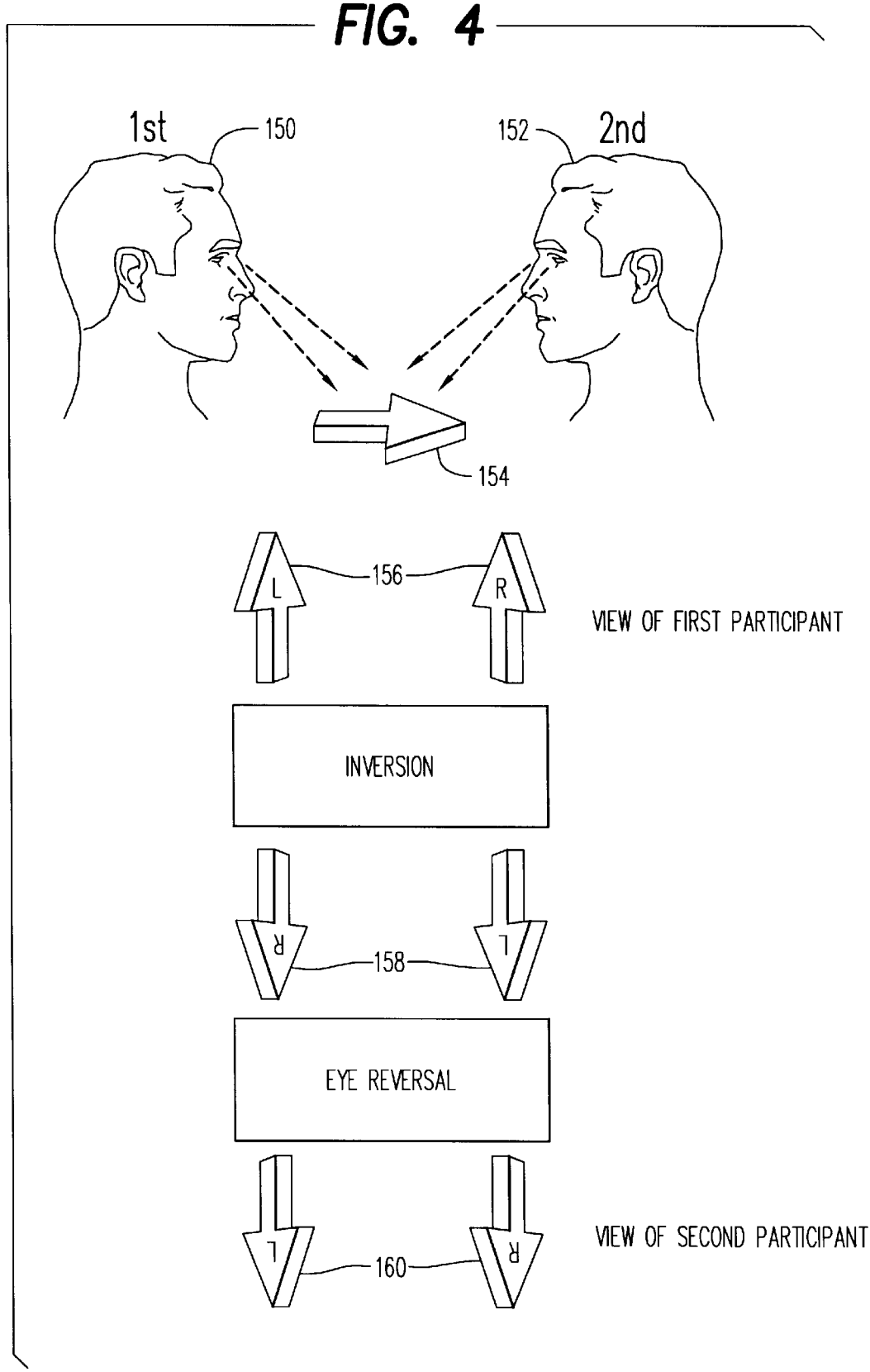

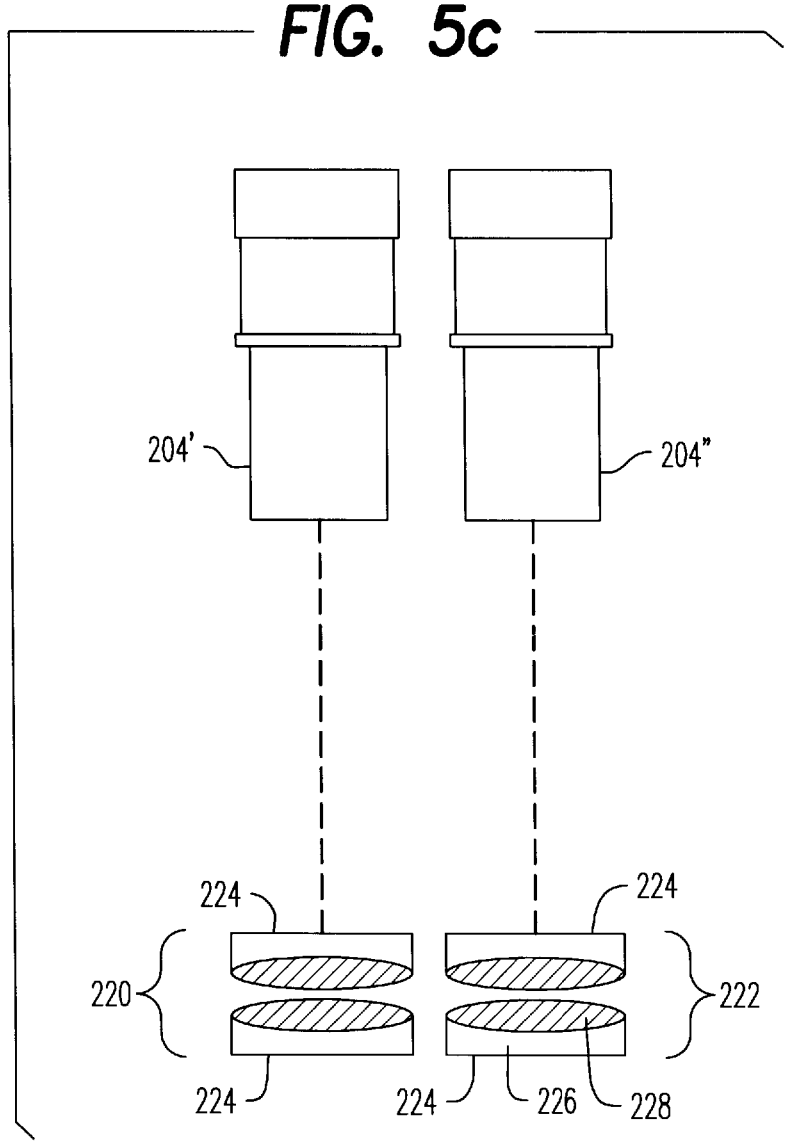

STEREOSCOPIC ON-SCREEN SURGICAL MICROSCOPE SYSTEMS

FIELD OF THE INVENTION

The present invention relates to systems and apparatus for providing stereoscopic displays in clinical, laboratory, industrial or educational settings and, more particularly, to techniques for three-dimensional viewing of surgical procedures performed with aid of a surgical microscope to provide a display for participants or observers at the procedure.

BACKGROUND AND OBJECTS OF THE INVENTION

Current surgical apparatus and techniques permit operations on progressively smaller and more delicate structures. Microsurgery typically involves operating on a structure while viewing it through a microscope. It is routinely used to operate on all areas of the body. Applications have been found in such varied fields as ophthalmology, otology, peripheral vascular surgery, urology, obstetrics, gynecology, neurosurgery, reconstructive surgery, periodontics and endodontics.

Dramatic reconstructive efforts, such as transplanting tissues from one area of the body to rebuild another or replanting severed digits, have now become commonplace. Microsurgical procedures, once highly unreliable, are an irreplaceable part of the surgical field with successful and predictable results.

Stereoscopic images provide our minds with large amounts of information quickly and intuitively. Stereoscopic images are easier to comprehend, more natural to work with, and more dramatic to view than "flat" monocular images. Binocular or stereoscopic vision involves the recognition of spatial relationships among objects. This relationship, commonly referred to as "depth perception", is essential for performing fine manual exercises. Nowhere is this interplay between stereoscopic vision and motion more acutely illustrated than the fine motions magnified and guided with the microscope during the microsurgery.

Useful binocular microscopes have been available since the last century. Such microscopes have come to be used by surgeons who view the procedure through a pair of microscope eyepieces.

A stereoscopic television monitoring system was developed as early as 1985. Using two monitors and a special mirror box located directly in front of the eyes of the surgeon, assistant, or medical student, the stereoscopic image could only be seen by a limited number of observers. Sugita et al. "Stereoscopic television system for use with the operating microscope. Technical note. J. Neurosurg 62:610–611 (1985).

A stereo operating microscope is disclosed in Reinhardt et al. "Stereo-Microvision", *Bildgebung* 1993; 60:105–109. As shown in FIGS. 1 and 3, a small camera microscope is substituted for the usual operating microscope. The stereoscopic image appears on a single monitor suspended above the patient. The surgeon wears passive spectacles having slightly tinted, circularly polarized lenses.

A similar system is described in Kobayashi et al., "Three-dimensional videomonitor in microsurgery", *Neurochicurgia* 1993, 36:129–130 (New York). A Zeiss operation microscope is equipped with two CCD camera heads. Three-dimensional ("3D") images of the operation field are observed in a TV monitor through polarization glasses. The 3D images may also be observed in a special observation room or recorded on videotape.

A system employing a single HDTV cameras is shown in Okudera et al. "Three-dimensional Hi-Vision System for Microneurosurgical Documentation Based On Wide-Vision Telepresence System Using One Camera And One Monitor", *Neurol. Med. Chir.* 1993 33:719–721 (Tokyo).

The systems of the prior art suffer from a number of shortcomings. One major shortcoming is illustrated by considering the many surgical procedures involving more than one physician working in the same microscopic field view, but accessed from different directions. Typically, two physicians participate, one as an "operator" or attending surgeon, the other as an assistant. Prior art systems failed to provide correctly oriented images through the microscope eyepieces or on a single monitor for physicians at different locations. This is a major impediment to the performance of the surgical technique. In maximizing access and visibility for the attending surgeon, the assistant must accept whatever position and viewpoint is left available.

It is an object of the present invention to provide improved stereoscopic on-screen surgical microscope systems.

It is another object of the present invention to provide apparatus and methods for permitting surgery participants to approach a surgical site from different directions while viewing a stereoscopic image of the operating field correctly oriented for their point of view.

It is a further object of the present invention to provide apparatus for retrofitting existing conventional surgical microscopes to provide equivalent three-dimensional displays to multiple participants.

It is known in the prior art to employ eyepiece adapters to convert conventional surgical microscopes for stereoscopic television monitoring. These systems have the advantage of permitting use of familiar and tried surgical microscopes. However, these systems have a number of possible disadvantages. The eyepiece adapters may not provide adequate parfocal operation of the microscope; the surgeon must refocus at the extremes of magnification when zooming in and out. Such eyepiece adapters may have a different field of view or different effective magnification or different depth of focus, requiring retraining of surgical personal to accommodate such changes. With such eyepiece adapters, it is also difficult to maintain the necessary precise alignment between the two separate cameras mounted on separate eyepieces. The stereoscopic effect may be destroyed by either camera slipping along its optical axis, slipping laterally across its optical axis or rotating about its optical axis. Finally, such eyepiece adapters disable the eyepieces from conventional use.

Accordingly, it is an object of the present invention to provide a camera pod for retrofitting conventional surgical microscopes to provide a depth of field, magnification, parfocality field of view, and consistent optical alignment comparable to unmodified microscope.

It is a further object of the present invention to provide a camera pod which can either replace a binocular microscope eyepiece fixture with a quick-release (or quick-change) stereo-video fitting or be attached to a second port of the microscope's beam splitter.

These and other objects and features will become apparent from a reading of the following summary and detailed description of the drawings.

SUMMARY OF PREFERRED EMBODIMENTS

A preferred embodiment of the present invention is a method for displaying images from a stereoscopic surgical microscope to at least two participants in a surgical procedure located in different positions in relation to the patient and, consequently, having different viewpoints or perspectives, in particular, two surgeons located on opposite sides of the patient. According to the method, a video camera pod is mounted on a custom built or retrofitted stereoscopic surgical microscope. The pod produces a first video signal corresponding to a left eye viewpoint of the first participant and a second video signal corresponding to a right eye viewpoint of the first participant. A first display monitor and image selective eyewear are provided for the first participant. Images corresponding to the first video signal are displayed to the left eye of the first participant and images corresponding to the second video signal are displayed to the right eye of the first participant. A second display monitor and image selective eyewear are provided for the second participant. Inverted images corresponding to the first video signal are displayed to the right eye of the second participant and inverted images corresponding to the second video signal are displayed to the left eye of the second participant, whereby both participants receive a magnified, stereoscopic view of the surgical procedure oriented to correspond to the viewpoint of each participant.

In preferred embodiments, the image selective eyewear is an active shutter system driven in synchronization to the respective display monitor. The first participant's eyewear transmits images corresponding to the first video signal to the left eye and blocks images corresponding to the second video signal from the left eye; and the first participant's eyewear transmits images corresponding to the second video signal to the right eye and blocks images corresponding to the first video signal from the right eye. The second participant's eyewear transmits images corresponding to the first video signal to the right eye and blocks images corresponding to the second video signals from the right eye; and the second participant's eyewear transmits images corresponding to the second video signal to the left eye and blocks images corresponding to the first video signal from the left eye.

A stereoscopic on-screen surgical microscope apparatus, in accordance with the present invention may include a binocular surgical microscope, a video camera pod optically coupled to the microscope, a display monitor for displaying stereoscopic video images to each of the participants in the surgery, eyewear for the surgery participant(s) for separating left and right images appearing on the display monitor(s), and a switch on each monitor for selectively inverting the image displayed on the display monitor to orient the image to correspond to the viewpoint of the participant. In a further preferred embodiment, a switch is provided for selectively reversing the images viewed by the right and left eyes of the participant to achieve a natural stereoscopic effect.

More particularly, the stereoscopic image orientation switching system may include a first switch for selectively up-down reversing the first and second images, a second, independent switch for selectively right-left reversing the first and second images, and a third, independent switch for selecting which eye observes which of the first or second images. The display monitor may be a modified cathode ray tube display with vertical and horizontal magnetic yokes for beam deflection. The first switch may reverse the polarity of a signal applied to the vertical yoke and said second switch may reverse the polarity of a signal applied to the horizontal yoke. These connections may be made by modifying the chassis of the display monitor to provide an input/output socket to which the switches are attached.

A video camera pod of a preferred embodiment of the present invention is employed to retrofit a surgical microscope for use in a stereoscopic on-screen display system. The pod may include a flange for releasably mounting the pod to a binocular surgical microscope so that the pod is positioned to receive light corresponding to the left perspective viewpoint and right perspective viewpoint images from the microscope. At least one optical detector converts the received light into left and right video signals. A lens system is located in the optical paths between the microscope and the detector and is selected and positioned to match the field of view and magnification of the pod with that which would be seen through the eyepieces of the surgical microscope. The system maintains focus of the images over the range of magnifications of the host microscope.

BRIEF DESCRIPTION OF THE DRAWINGS

FIG. 3a is a schematic diagram of switching circuitry employed in preferred embodiments of the present invention;

FIG. 4 is a diagram illustrating the functioning of the switching circuitry of FIG. 3a;

FIG. 5b is a top view of the stereo camera pod of FIG. 5a

FIG. 5c is a schematic illustration of optical elements of a preferred embodiment of the camera pod of FIG. 5a.

DESCRIPTION OF PREFERRED EMBODIMENTS

Figure 1:
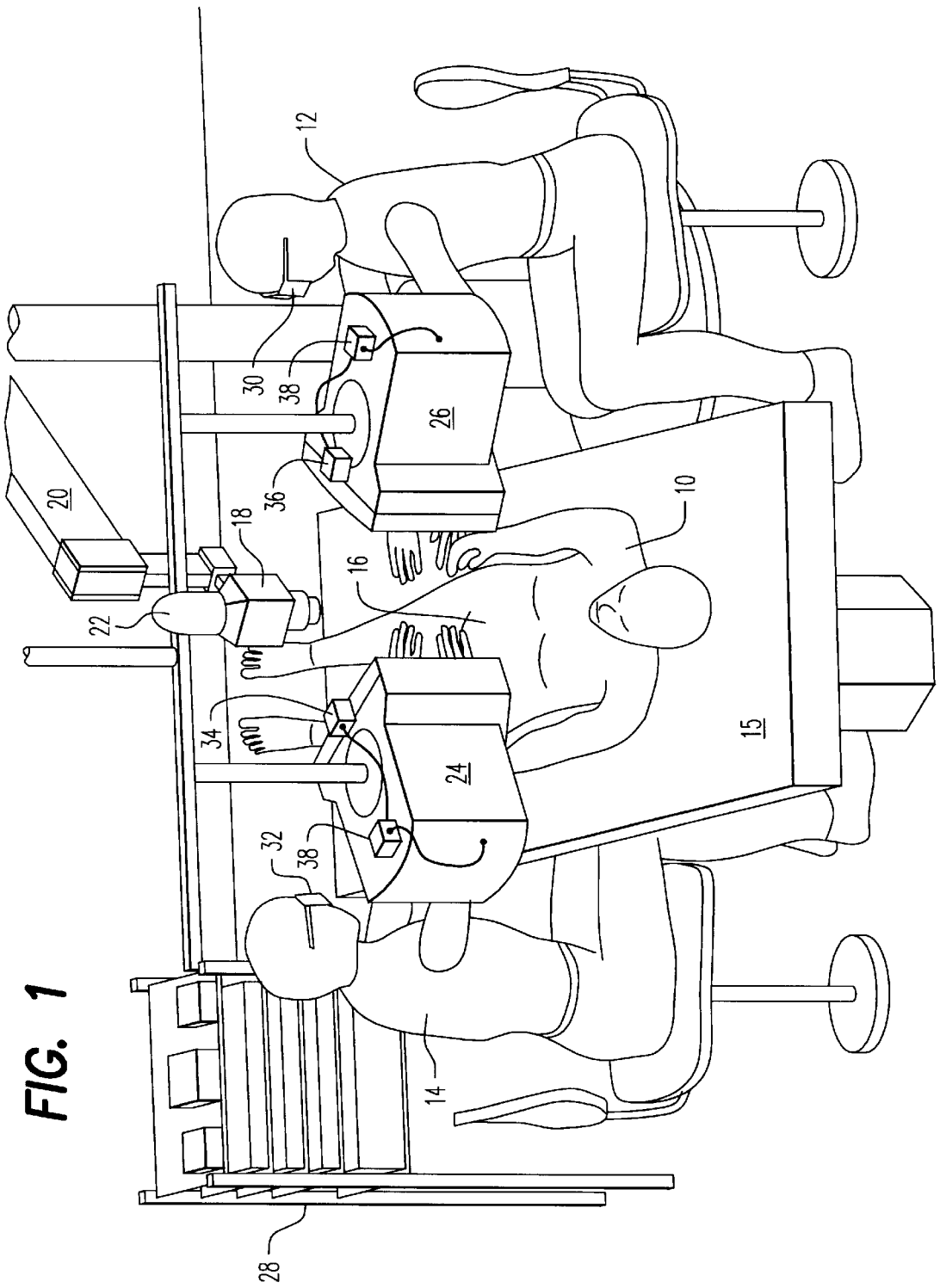
FIG. 1 is a pictorial view of a stereoscopic on-screen surgical microscope system of a preferred embodiment of the present invention employing two display monitors for use by two participants in a surgical procedure.

FIG. 1 illustrates, in pictorial form, an operating room equipped with a stereoscopic on-screen surgical microscope system. By way of example, a surgical procedure is depicted involving a patient 10, an attending surgeon 12 and an assisting surgeon 14. The two surgeons are located across the operating table 15 from one another, and thus have diametrically opposite views of surgery field 16.

A surgical microscope 18 is mounted above the patient on a boom 20, and is selectively positionable to view the surgery field 16. In a preferred embodiment, the boom may be a remotely operated positioner. The surgical microscope may be a conventional microscope such as a Zeiss or Wild M600-700 stereo microscope, retrofitted for use in practicing the present invention.

A stereo camera pod 22, which may be configured as described in connection with FIG. 5, is mounted to the surgical microscope 18. Images from the stereo camera pod 22 may be displayed on the attending surgeon's display monitor 24 and the assisting surgeon's display monitor 26, as well as on other display monitors available to other participants and observers (not shown). Camera controllers, distribution amplifiers, stereo image encoder/multiplexers and switching circuitry, described in detail in connection with FIG. 2, may be located in an equipment rack 28 adjacent the operating table.

The surgeons 12 and 14 are outfitted with stereoscopic eyewear 30 and 32, respectively. The eyewear is designed to select different images displayed by a single monitor to replicate stereoscopic vision of the magnified field of surgery.

A number of systems for providing stereoscope television displays are known in the art. Such systems include passive systems, in which polarized goggles selectively transmit or block optically combined left and right perspective images from a television display. Also known are active systems for multiplexing and demultiplexing signals representing left and right perspective viewpoints. See, e.g. U.S. Pat. Nos. 4,967,268 and 5,193,000, the disclosures of which are incorporated herein by reference. A system found particularly useful in practicing the present invention is known as CRYSTAL-EYES®, a product of Stereographics, San Rafael, Calif. This system employs electronic combinations of left and right video signals and active shutters for producing stereoscopic displays. Left and right perspective views are field sequentially displayed on a television monitor. The viewer wears active shutter goggles with a liquid crystal assembly for selectively transmitting or blocking images from the monitor to the left or right eye. A remote emitter, in electronic communication with left and right video signal multiplexing circuitry, transmits an infrared synchronization signal to the goggles. Drive circuitry in the goggles selectively activates the liquid crystal assembly to transmit or block the image currently displayed on the monitor so that the left eye is exposed to a sequence of left perspective image fields and the right eye is exposed to a sequence of right perspective image fields. The goggles turn clear when the wearer looks away from the display monitor, for example, to select an instrument for use in the surgical procedure. Systems are commercially available which have resolution and refresh rate acceptable for use in microsurgery.

Figure 2:
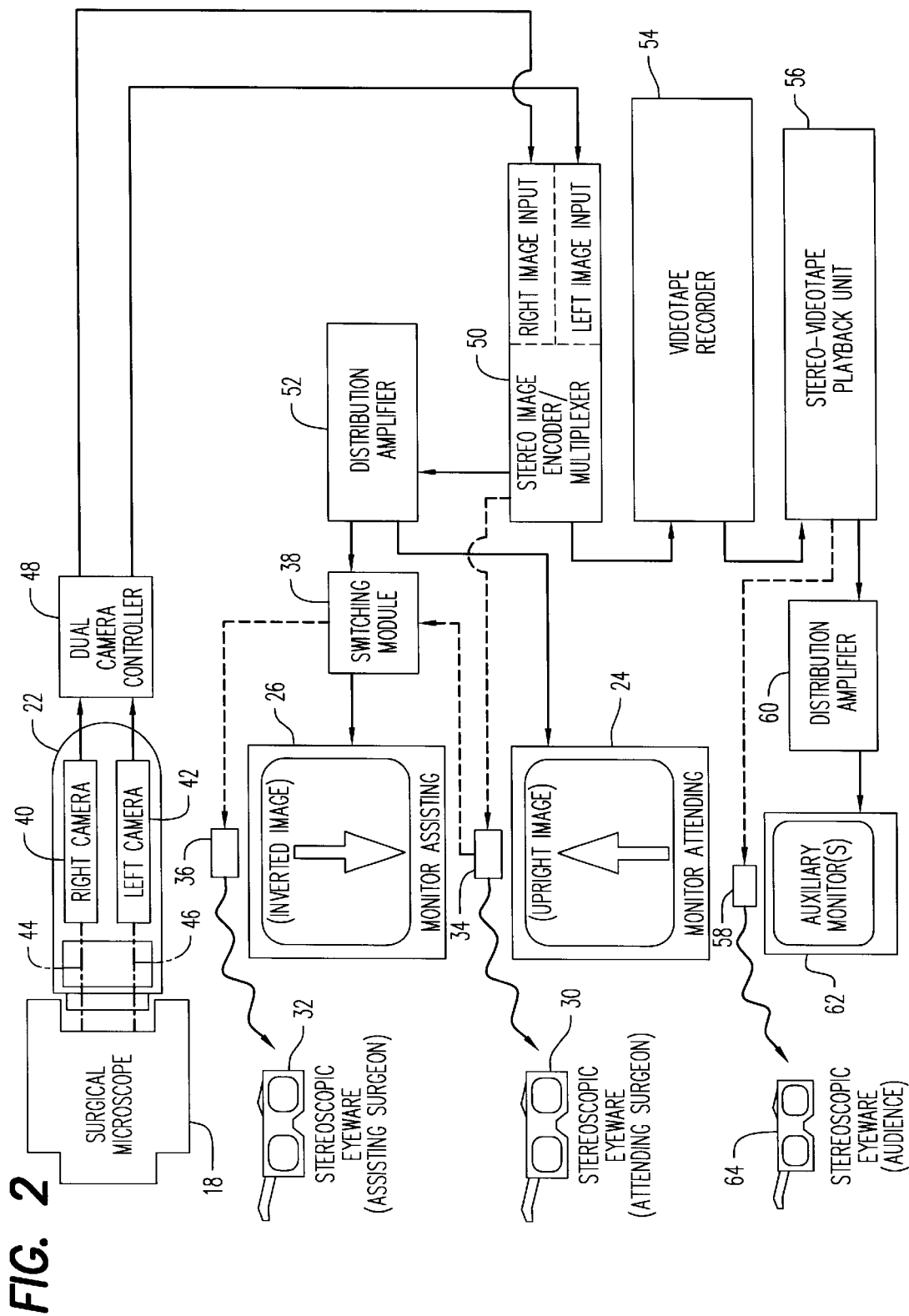
FIG. 2 is a schematic block diagram of an apparatus which may be employed in a stereoscopic on-screen surgical microscope system.

As shown in FIG. 2, a camera pod 22 may contain a right camera 40 and a left camera 42, located in optical paths 44 and 46 of the objective lens system of the surgical microscope 18. Electrical output signals from the cameras are applied to the dual camera controller 48. A first video signal from the dual camera controller corresponding to a left eye view point is applied to a stereo image encoder/multiplexer 50. Likewise, a second video signal from the dual camera controller is applied to the encoder/multiplexer 50. Advantageously, the encoder/multiplexer 50 is of the type described above for multiplexing the left and right channels of picture information into a single video channel output signal and for encoding a synchronization signal which is transmitted by emitters 34 and 36 to the stereoscopic eyewear of participants or real-time observers.

Signal processing in this system proceeds as follows. The left and right cameras each produce a standard Y/C (luminance/chrominance) video signal, which comprises 525 horizontal lines per video frame. The encoder/multiplexer 50 interlaces these two signals into a custom signal containing 1050 lines per complete video frame. The signal that the encoder/multiplexer sends to the display monitor is transmitted as a sequence of parts, or "fields", of a complete frame interlaced in the following manner:

1 "odd-numbered" lines of the left image;

2 "odd-numbered" lines of the right image;

3 "even numbered" lines of the left image;

4 "even-numbered" lines of the right image.

Each field is shown on the display monitor for ¹⁄₁₂₀th of a second. One complete cycle of fourfold interlacing takes ¹⁄₃₀th of a second. Thus, one complete stereoscopic video image appears on the monitor each ¹⁄₃₀th of a second. The processor's synchronizing signal sent via the infrared emitters 34 to the stereoscopic eyewear causes a left lens eyewear to be transparent and a right lens to be opaque during steps 1 and 3 of the cycle. The right lens is transparent and the left lens is opaque during steps 2 and 4 of the cycle. Therefore, the attending surgeon's left and right eyes see only the images from the corresponding cameras. Because each eye sees half of the total video signal, the effective resolution of the stereoscopic image on the monitor is 525 horizontal lines. A signal sent by the process to a video tape recorder 54 may be compressed by half to be recorded onto standard S-VHS videotape (which is formatted to accept a standard Y/C signal).

The multiplexed video signal from the encoder/multiplexer 50 may be applied to a distribution amplifier 52. In the embodiment of FIG. 2, the amplifier 52 is a two-way distribution amplifier for providing the multiplexed video signal to the attending surgeon's display monitor 24 and simultaneously, to the assisting surgeon's display monitor 26.

In the embodiment of FIG. 2, a switching module 38 is located in the signal path of the multiplexed video signal from the distribution amplifier. It is also in the signal path of the encoder synchronization signal first applied to emitter 34 and thereafter to emitter 36. The structure and operation of such a switching module is described in greater detail in connection with FIGS. 3 and 4. It should be noted here, that for simplicity a switching module has been included only for signals used in the assisting surgeon's monitor 26 and emitter 36. It will be readily understood that maximum system flexibility is achieved where a switching module is associated with each monitor display.

There are circumstances where a switching module can be used in system configurations having a single monitor. For example, in the use of a surgical microscope for periodontal work by a single dentist, the most effective image orientation may require inversion. In circumstances where a mirror is used in the procedure, left-right reversal, with or without up-down reversal, may be achieved with the aid of the switching module 38. Thus, the switching module provides the necessary flexibility to use the stereoscopic microscope system in widely varied configurations involving one or more display monitors and various orientations corresponding to the location and points of view of various participants and observers.

In addition, the multiplexed stereoscopic video signal can be recorded on the videotape recorder 54 as noted above. Thus, stereoscopic images of the surgical procedure may be replayed, for example, as part of learning exercises for medical professionals. A replay system (or auxiliary real time display system) may be connected to the videotape recorder 54. Such a system may include a stereo-videotape playback unit 56 which derives encoded synchronization signals for auxiliary emitters, such as emitter 58. A distribution amplifier 60 receives the multiplexed stereoscopic video signal from the playback unit and applies it to one or more auxiliary display monitors 62. Viewers of these monitors may be provided with stereoscopic eyewear 64, of the type previously described for selectively transmitting and blocking images presented on the display monitor 62.

The structure and operation of a preferred embodiment of the switching module will now be described in connection with FIGS. 3a and 3b. Inversion of the video image is achieved by DPDT switches S1 and S2. A third DPDT switch S3 is employed to achieve emitter phase reversal.

Figure 3B:
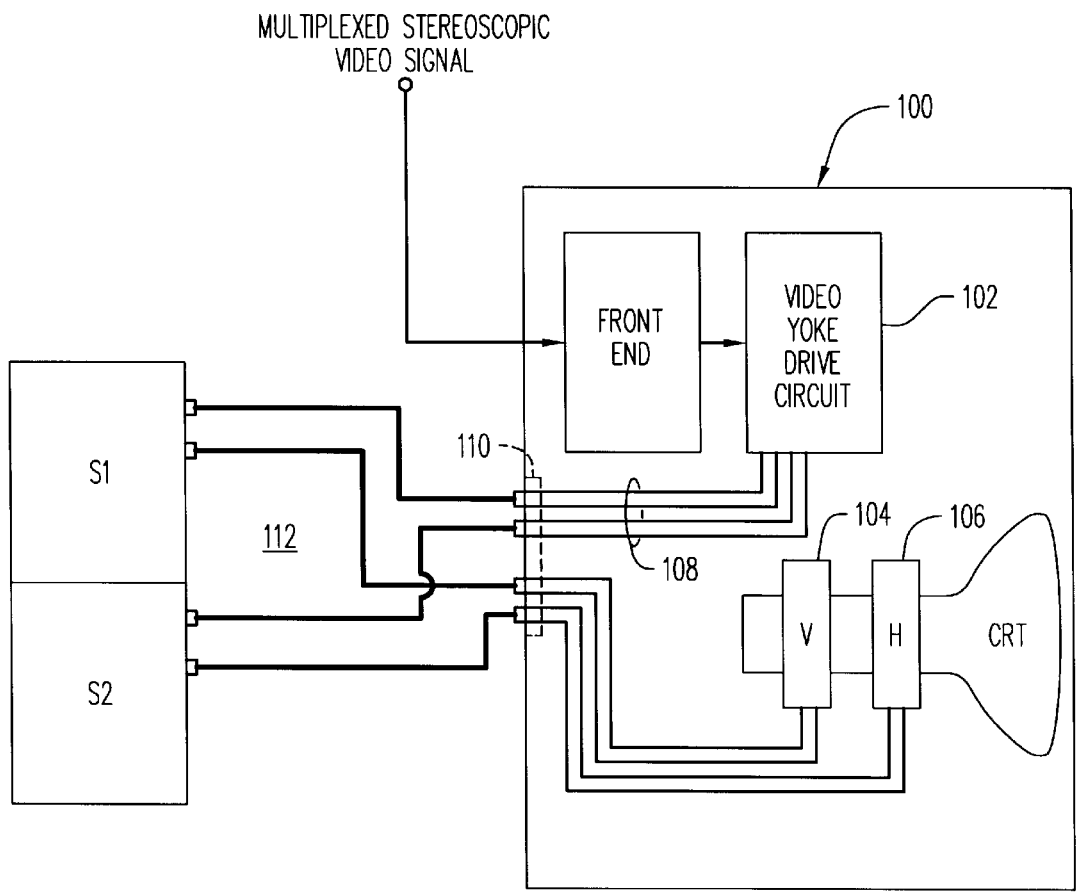
FIG. 3b is a schematic diagram showing the connection of switching circuitry of FIG. 3a to a CRT display monitor.

An advantageous means of connecting the switching module to a conventional CRT display monitor 100 is illustrated in FIG. 3b. Normally, in such a display monitor, a video yoke drive circuit 102 is connected directly to the CRT vertical yoke 104 and horizontal yoke 106. The polarity of the connection is such that the conventional up-down/right-left orientation of images is displayed.

The display monitor 100 may be modified by interrupting the circuit paths 108 connecting the video yoke drive circuit to the respective yokes, and inserting switches S1 and S2 into the circuit. A socket 110 and cabling 112 may be provided for this purpose The effects of switches S1, S2 and S3 are illustrated in FIG. 4. In that Figure, two observers 150 and 152 are shown, viewing a reference object 154. It is assumed that a stereoscopic surgical microscope and camera pod assembly is directed at the reference object 154 in such a way that the orientation and prospective of the image produced corresponds to that which would be seen by the first participant either directly or through the microscope eyepieces. This image pair, as it would be seen by the left and right eye of the first participant, is identified by the numeral 156. Switches S1 and S2 produce a vertical inversion and a horizontal inversion, respectively, by reversing the polarity of the vertical and horizontal yoke signals. The effect is both an up-down reversal and a left-right reversal. This is referred to collectively as an "inversion", the effects of which are illustrated by the image pair 158. Alternatively, a mirror image can be produced by activating only switch S2 thereby producing a left-right reversal without an up-down reversal (not shown).

Referring once more to FIG. 3a, a switch S3 is shown for performing emitter phase reversal. Normally, in the chassis of emitters 34 and 36 as shown in FIG. 2, the positive pole of an emitter phase circuit is connected to a positive pole of an infrared LED array which transmits the synchronization signal to the eyewear. The negative poles are likewise connected. In this arrangement, a signal is sent by the emitter and received by the eyewear which shutters the wearer's eyes in such a way that the left eye views image fields corresponding to the normal left eye viewpoint, and the right eye views image fields corresponding to the normal right eye viewpoint. Switch S3 is provided to selectively reverse the output of the emitter such that the images viewed by each eye are reversed. The effect of this eye reversal is shown in the pair of images 160 of FIG. 4. Were this not done, the perceived stereoscopic effect of the images would be incorrect, making distant objects appear close and close objects appear distant. The images 160 represent a view which is displayed to the second participant (for example the assisting surgeon shown in FIG. 1). The net effect of the inversion and eye reversal is to provide the second participant with essentially the same stereoscopic images as would be present if the second participant directly viewed the reference object from the position and orientation shown at the top of FIG. 4, thus enhancing such things as handeye coordination which may be required in a surgical procedure.

Figure 5A:
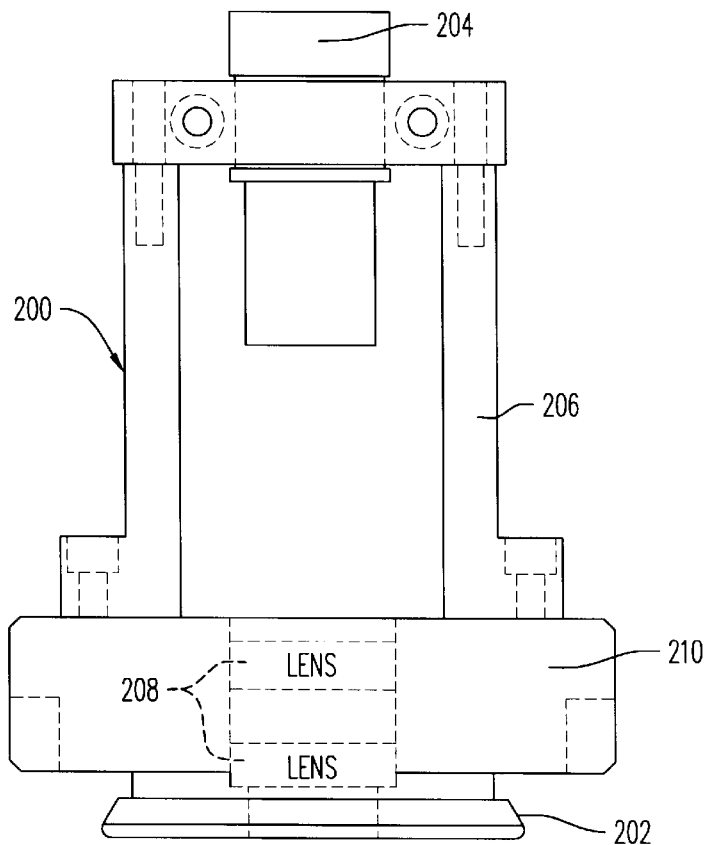
FIG. 5a is a side view of a stereo camera pod of a preferred embodiment of the present invention adapted for attachment to a surgical microscope.
Figure 5B:
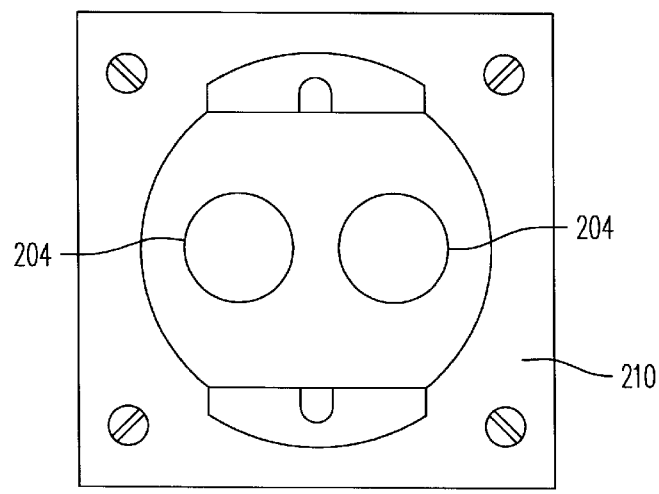

FIGS. 5a and 5b are, respectively, side and top views of the internal structure of a video camera pod 200 for retrofitting a surgical microscope for use in a stereoscopic on-screen display system. A male flange 202 is provided for releasably mounting the pod to a binocular surgical microscope. For example, the pod can be mounted in the still camera mount of the microscope, thus leaving both eyepieces available for use. The dimensions and configuration of the flange are selected to adapt, for example, to the still camera port of one or more conventional surgical microscopes. When mounted, the pod is positioned to receive light corresponding to the left and right perspective viewpoint images of the microscope.

The pod employs at least one optical detector for converting left and right optical image information into electrical signals. In a preferred embodiment two optical detectors 204 may be mounted in the pod and separated by a distance corresponding to the axial separation of the microscope. In a further preferred embodiment these detectors may be CCD camera elements such as Micro camera IK-M41A marketed by Toshiba or color video camera module XC-999 marketed by Sony Corporation. Such camera elements are rigidly held in position in the pod at their respective optical axes of the microscope by upright members 206.

Lenses 208 are placed in the optical paths of the pod in a base member 210. The lenses direct the magnified images on the plane of focus of the CCD chip(s). The robustness of CCD chip and lens alignment within the pod assures production of stable, properly focused images.

FIG. 5c is an illustration of optical elements employed in a preferred embodiment of the video camera pod of FIG. 5a, especially adapted for use with typical configurations of Wild M600 and M700 series surgical microscopes and the Vasconcellas M900 series surgical microscopes. Two optical detectors 204' and 204" are held in fixed position on the optical axes of two lens assemblies 220 and 222, respectively. Each lens assembly is made up of two back-to-back oriented, precision optimized achromats 224.

Each achromat is formed by cementing one plano concave lens 226 to one double convex lens 228. In this particular embodiment the achromats are 19 mm in diameter and have a focal length of 90 mm. The optical detectors are positioned coaxially above the left and right lens assemblies as indicated in FIG. 5c.

The foregoing is an example of an optical system used in the video camera pod. Other such optical systems may be designed which match the field of view and magnification of the pod with that which would be seen through the eyepieces of a particular microscope, and also to insure parfocality, i.e. the maintenance of focus over the range of magnification of the host microscope. This facilitates training of surgical personnel already familiar with performing micro-surgery while viewing the procedures through the eyepieces of the surgical microscope being retrofitted.

The foregoing description is intended to be illustrative and provide examples of embodiments of the invention. Various changes in structures and techniques may be made by those skilled in the art which lie within the spirit and scope of the following claims.

I claim:

1. A method for displaying images from a stereoscopic surgical microscope to at least two participants in a surgical procedure located on opposite sides of a patient comprising the steps of:

mounting a video camera pod on the stereoscopic surgical microscope for producing a first video signal corresponding to a left eye viewpoint of the first participant and a second video signal corresponding to a right eye viewpoint of the first participant;

providing a first display monitor and image selective eyewear for the first participant;

displaying, from the first display monitor, images corresponding to the first video signal for the left eye of the first participant and images corresponding to the second video signal for the right eye of the first participant;

providing a second display monitor and image selective eyewear for the second participant; and displaying, from the second display monitor, inverted images corresponding to the first video signal for the right eye of the second participant and inverted images corresponding to the second video signal for the left eye of the second participant, whereby both participants receive a magnified, stereoscopic view of the surgical procedure oriented to correspond to the viewpoint of each participant.

2. The method of claim 1, wherein the image selective eyewear contains an active shutter driven in synchronization to the respective display monitor;

wherein the second participant's eyewear transmits images corresponding to the first video signal to the right eye and blocks images corresponding to the second video signals from the right eye; and wherein the second participant's eyewear transmits images corresponding to the second video signal to the left eye and blocks images corresponding to the first video signal from the left eye.

3. The method of claim 1, wherein the displaying of the inverted images includes the steps of reversing the polarity of a signal provided to a vertical deflection yoke of the second display monitor and reversing the polarity of a signal provided to a horizontal deflection yoke of the second display monitor.

4. A stereoscopic on-screen surgical microscope system comprising:

a binocular surgical microscope with left and right eyepieces;

a video camera pod optically coupled to the microscope for producing a first video signal corresponding to the field of view and perspective of the left eyepiece and a second video signal corresponding to the field of view and perspective viewpoint of the right eyepiece;

a display monitor for displaying the first and second video signals to a participant in the surgery;

eyewear for the surgery participant for separating left and right images appearing on the display monitor; and means for selectively left-right reversing and selectively up-down reversing the image displayed on the display monitor for orienting the image to correspond to the viewpoint of the participant.

5. The system of claim 4, further comprising a second display monitor, second selective reversing means and eyewear for a second participant in the surgery, for displaying the first and second video signals to the second participant in the surgery wherein the image displayed on the second monitor corresponds to the viewpoint of the second participant.

6. The system of claim 4, wherein the eyewear includes a left eye active shutter and a right eye active shutter for blocking images corresponding to the first video signal from one eye and for blocking images corresponding to the second video signal from the other eye; and further comprising means for selectively reversing the images blocked from each eye.

7. A stereoscopic image orientation switching system for a stereoscopic display system including a display monitor for displaying first and second images from two different viewpoints and eyewear through which said images are separated into images presented to the left eye and images presented to the right eye, comprising:

a first switch for selectively up-down reversing the first and second images; and a second switch for selectively, right-left reversing the first and second images.

8. The system of claim 7, wherein the eyewear includes a pair of active shutters driven responsive to an emitter synchronized with a sequential display of the first and second images, the system further comprising:

a third switch connected to the emitter for selecting which eye observes which of the first or second images.

9. The system of claim 7, wherein the monitor is a cathode ray tube display with vertical and horizontal magnetic yokes for beam deflection and wherein:

said first switch reverses the polarity of a signal applied to the vertical yoke; and said second switch reverses the polarity of a signal applied to the horizontal yoke.

10. The system of claim 7, wherein the images displayed are obtained from a binocular surgical microscope used in a surgery involving a patient and more than one surgeon participant, wherein an attending surgeon views the surgery through an attending surgeon's monitor and an assisting surgeon views the surgery through the monitor connected to said switches, said switches being set so that the image viewed by the assisting surgeon corresponds to the assisting surgeon's view of the patient.

11. A video camera pod for retrofitting a surgical microscope for use in a stereoscopic on-screen display system comprising:

means for releasably mounting the pod to a binocular surgical microscope so that the pod is positioned to receive light corresponding to left perspective viewpoint and right perspective viewpoint images from the microscope;

at least one optical detector for converting said light into left and right video signals; and a lens system in an optical path between the microscope and the detector, wherein the lens system is selected and positioned to match the field of view of the pod with that which would be seen through the eyepieces of the surgical microscope.

12. The video camera pod of claim 11, wherein the surgical microscope has a range of magnifications and wherein the pod maintains focus of the images over the range of magnifications.

13. The video camera pod of claim 11, wherein the mounting means is a circular flange configured for mechanical coupling to a corresponding structure of the surgical microscope.

14. The video camera pod of claim 11, wherein the at least one optical detector is at least one CCD chip.

15. The video camera pod of claim 11 wherein the at least one optical detector is a pair of CCD chips rigidly mounted in position with respect to said lens system.

* * * * *